United States Patent
Yoshida et al.

(10) Patent No.: US 7,174,435 B2
(45) Date of Patent: Feb. 6, 2007

(54) MEMORY CONTROL CIRCUIT, MEMORY DEVICE, AND MICROCOMPUTER

(75) Inventors: Tetsuya Yoshida, Kawasaki (JP); Yoshihiko Koike, Kawasaki (JP); Masayoshi Kusumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 10/715,366

(22) Filed: Nov. 19, 2003

(65) Prior Publication Data

US 2004/0139289 A1    Jul. 15, 2004

(30) Foreign Application Priority Data

Dec. 26, 2002  (JP)  ............... 2002-378629

(51) Int. Cl.
*G06F 12/16*     (2006.01)
(52) U.S. Cl. ........................... 711/154; 714/5
(58) Field of Classification Search .................. None
See application file for complete search history.

(56) References Cited

U.S. PATENT DOCUMENTS 4,580,246 A * 4/1986 Sibigtroth ............... 365/195
5,973,968 A * 10/1999 Schu et al. ............... 365/195
5,991,197 A   11/1999 Ogura et al.
6,285,583 B1 * 9/2001 Cleveland et al. ..... 365/185.04
6,366,512 B1 * 4/2002 Yeh et al. ................. 365/203
2005/0038924 A1 * 2/2005 Takahashi ..................... 710/5

FOREIGN PATENT DOCUMENTS

JP       11-120781       4/1999

* cited by examiner

*Primary Examiner*—Reginald Bragdon
*Assistant Examiner*—Daniel Ko
(74) *Attorney, Agent, or Firm*—Staas & Halsey LLP

(57) ABSTRACT

First and second latch circuits store "0" and "1", respectively, by reset. An output signal from the first latch circuit is input to the second latch circuit. Register setting data is input to the first latch circuit via a first gate that allows an input signal to pass through when the output signal from the second latch circuit is "1", and outputs "0" when the output signal from the second latch circuit is "0". A write signal is supplied to a memory via a second gate that allows the input signal to pass through only when the output signal from the first latch circuit is "1". When the register setting data indicates "0", the output signals from both the first and the second latch circuits become "0", and until being reset, the write error protect state is maintained.

13 Claims, 5 Drawing Sheets

MEMORY CONTROL CIRCUIT, MEMORY DEVICE, AND MICROCOMPUTER

CROSS-REFERENCE TO RELATED APPLICATIONS

This application is based upon and claims the benefit of priority from the prior Japanese Patent Application No. 2002-378629, filed on Dec. 26, 2002, the entire contents of which are incorporated herein by reference.

BACKGROUND OF THE INVENTION

1) Field of the Invention

The present invention relates to a memory control circuit that prevents write errors in a rewritable memory, a memory device employing the memory control circuit, and a microcomputer equipped with the memory device.

2) Description of the Related Art

Normally in a memory in which data can be rewritten, stored data may be rewritten due to a noise or a momentary power failure. Therefore, in a nonvolatile memory such as a flash memory, a measure has heretofore been taken to prevent accidental rewrite of data due to such a malfunction. Even in a volatile memory such as a random access memory (RAM), it is necessary to prevent accidental rewrite of data due to a noise or the like.

Conventionally in products such as a microcomputer equipped with a nonvolatile memory, write errors are prevented by providing a security function circuit in the nonvolatile memory itself. However, there is a problem in that the circuit size of the nonvolatile memory increases by the security function circuit. Therefore, as a technique for preventing write errors without increasing the circuit size of the nonvolatile memory itself, it is proposed to provide a write enable register in a control circuit that controls an access to the nonvolatile memory, so that write into the nonvolatile memory is disabled or enabled by changing setting of the register. There is also a flash memory in which a storage area indicating write enable or disable of data with respect to a memory cell array is provided (for example, see Japanese Patent Application Laid-open No. H11-120781).

Conventionally, however, the write enable register can be freely rewritten, that is, there is no restriction in disabling or enabling write into the nonvolatile memory. Therefore, there is a problem in that it is insufficient as a measure for preventing write errors at the time of abnormal operation due to a noise or a momentary power failure.

SUMMARY OF THE INVENTION

It is an object of the present invention to solve at least the problems in the conventional technology.

The memory control circuit according to one aspect of the present invention includes a write error protect circuit that disables output of a write signal supplied from outside to a memory by resetting a register, outputs the write signal supplied from the outside to the memory upon writing a first data into the register, and prevents the output of the write signal to the memory upon writing a second data that is different from the first data into the register.

The memory device according to another aspect of the present invention includes a memory that is rewritable by an input of a write signal from outside to the memory, and a memory control circuit including a write error protect circuit that disables output of the write signal by resetting a register, outputs the write signal to the memory upon writing a first data into the register, and prevents the output of the write signal to the memory upon writing a second data that is different from the first data into the register.

The microcomputer according to still another aspect of the present invention includes a central processing unit, a memory that is rewritable by an input of a write signal from the central processing unit to the memory, and a memory control circuit including a write error protect circuit that disables output of the write signal by resetting a register, outputs the write signal to the memory upon writing a first data into the register, and prevents the output of the write signal to the memory upon writing a second data that is different from the first data into the register.

The other objects, features and advantages of the present invention are specifically set forth in or will become apparent from the following detailed descriptions of the invention when read in conjunction with the accompanying drawings.

DETAILED DESCRIPTION

Figure 1:
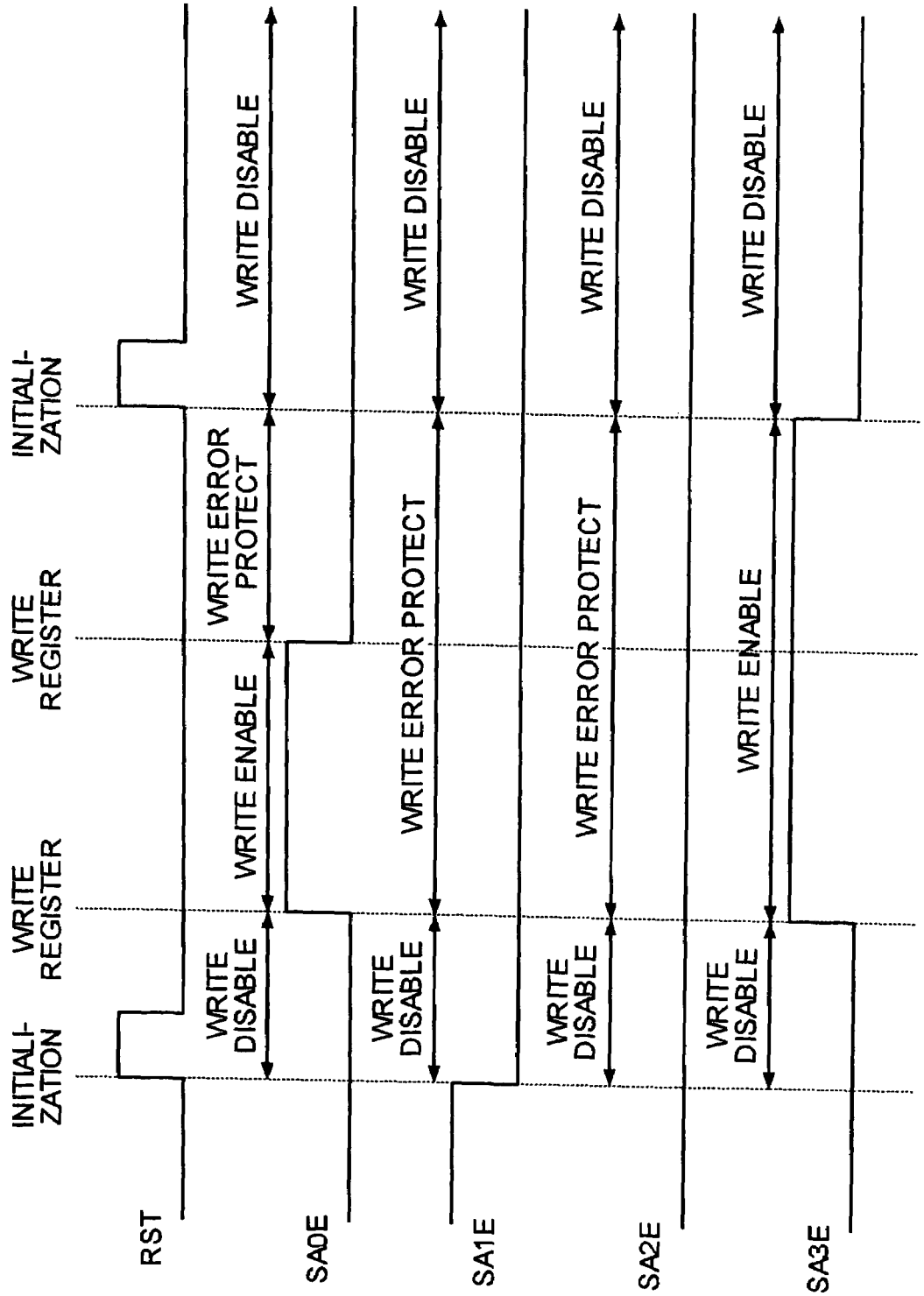
FIG. 1 is a timing chart of a register setting value of a write error protect circuit and respective states of write disable, write enable, and write error protect in a memory control circuit according to the present invention.
Figure 2:
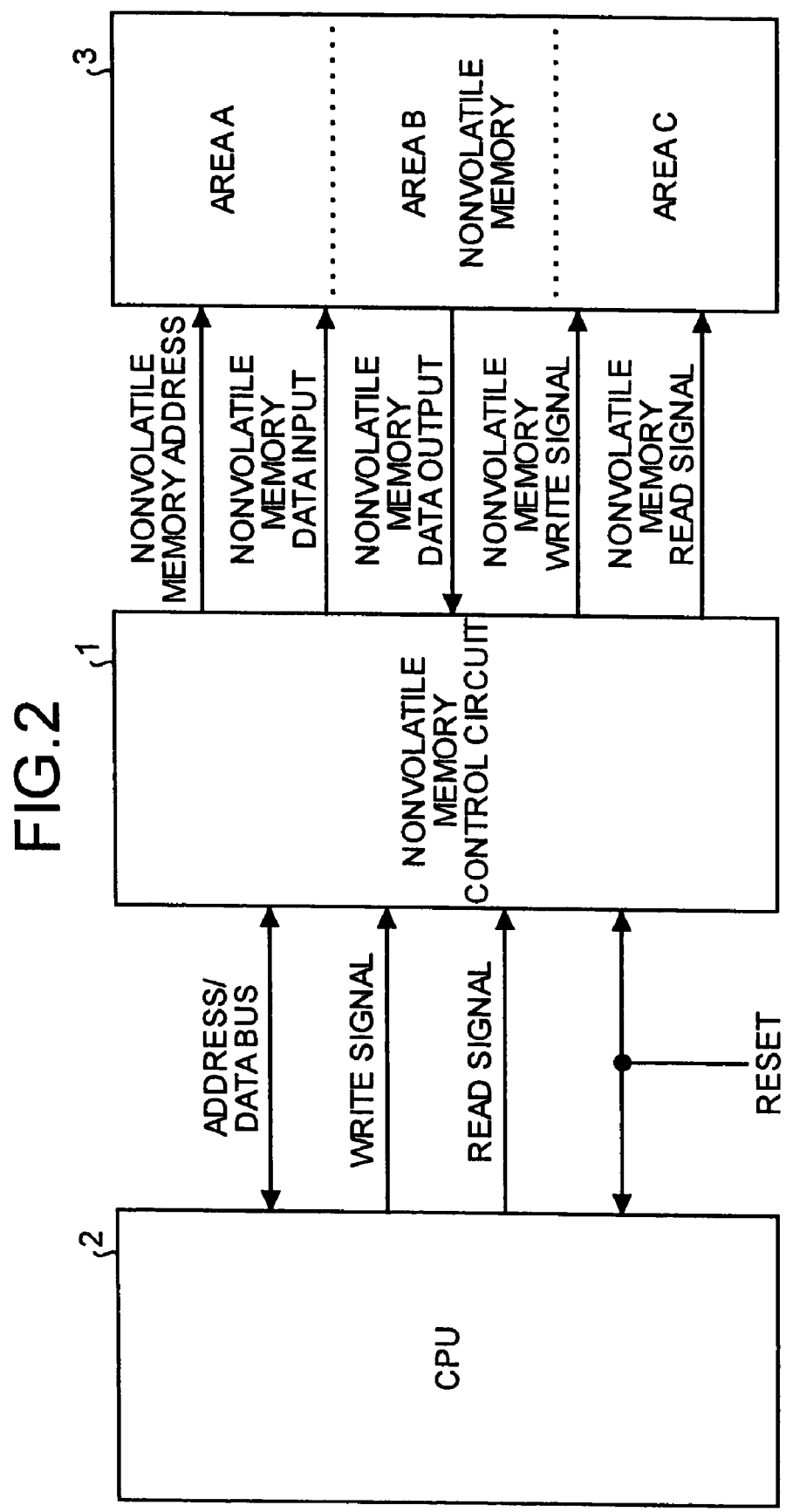
FIG. 2 is a schematic diagram of a microcomputer according to the present invention.

Exemplary embodiments of a memory control circuit, a memory device, and a microcomputer according to the present invention will be explained in detail with reference to the accompanying drawings. FIG. 2 is a schematic diagram of a microcomputer according to the present invention. As shown in FIG. 2, the microcomputer has a configuration such that a nonvolatile memory control circuit 1, a central processing unit (CPU) 2, and a rewritable nonvolatile memory 3 such as a flash memory are provided on the same semiconductor chip. The nonvolatile memory control circuit 1 and the CPU 2 are reset, when a reset signal is supplied from a reset circuit.

When data is written in the nonvolatile memory 3, the CPU 2 supplies write data and address data together with a write signal to the nonvolatile memory control circuit 1, via an address/data bus. The nonvolatile memory control circuit 1 supplies a nonvolatile memory write signal, write data, and address data to the nonvolatile memory 3. As a result, data is written in a corresponding portion of the nonvolatile memory 3.

On the other hand, when data is read out from the nonvolatile memory 3, the CPU 2 supplies address data together with a read signal to the nonvolatile memory control circuit 1. The CPU 2 then reads out the corresponding data from the nonvolatile memory 3, via the nonvolatile memory control circuit 1.

Figure 3:
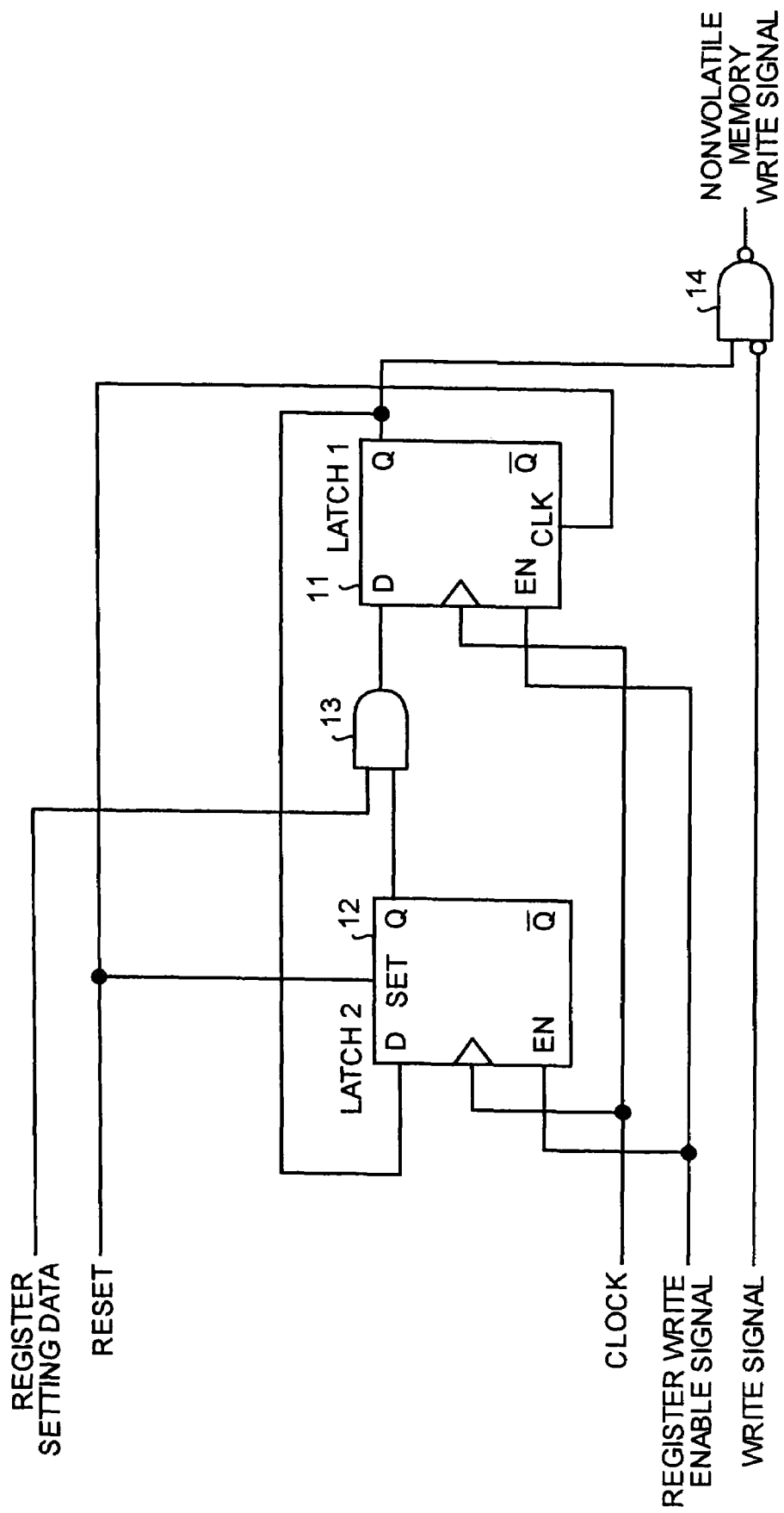
FIG. 3 is a circuit diagram one of an example of the write error protect circuit.

FIG. 3 is a circuit diagram one of an example of the write error protect circuit provided in the nonvolatile memory error protect circuit 1. As shown in FIG. 3, the write error protect circuit includes, for example, two latch circuits 11 and 12 and two gates 13 and 14, constituting a register. A reset signal supplied from a reset generation circuit is supplied to a clear terminal CLK in the first latch circuit 11 and a set terminal SET in the second latch circuit 12. Therefore, when the reset signal is asserted, "0" is output from an output terminal Q of the first latch circuit 11, and "1" is output from an output terminal Q of the second latch circuit 12.

The output signal from the output terminal Q of the first latch circuit 11 is supplied to an input terminal D of the second latch circuit 12. The output signal from the output terminal Q of the second latch circuit 12 is supplied to the first gate 13. The register setting data supplied from the CPU 2 is also input to the first gate 13. The first gate 13 is an AND gate, and the output signal thereof is supplied to an input terminal D of the first latch circuit 11. Therefore, when the output signal of the second latch circuit 12 is "1", the register setting data is input to the first latch circuit 11. When the output signal of the second latch circuit 12 is "0", the input signal to the first latch circuit 11 is "0".

The write signal supplied from the CPU 2 is supplied to the second gate 14. The output signal from the output terminal Q of the first latch circuit 11 is also supplied to the second gate 14. The second gate 14 is a NAND gate, and outputs a nonvolatile memory write signal to the nonvolatile memory 3. Though not particularly limited, in this embodiment, the write signal and the nonvolatile memory write signal are low active, and are asserted when the signal is "0". Though not particularly limited, it is assumed that other signals are high active.

Therefore, when the output signal from the first latch circuit 11 is "1", the nonvolatile memory write signal is asserted or negated, according to assert or negate of the write signal. When the output signal from the first latch circuit 11 is "0", the nonvolatile memory write signal is in a negated state at all times.

The register write enable signal supplied from the nonvolatile memory 3 in response to a write command from the CPU 2 is supplied to enable terminals EN of the first and the second latch circuits 11 and 12. A clock signal supplied from a clock generation circuit is supplied to clock terminals of the first and the second latch circuits 11 and 12.

Figure 4:
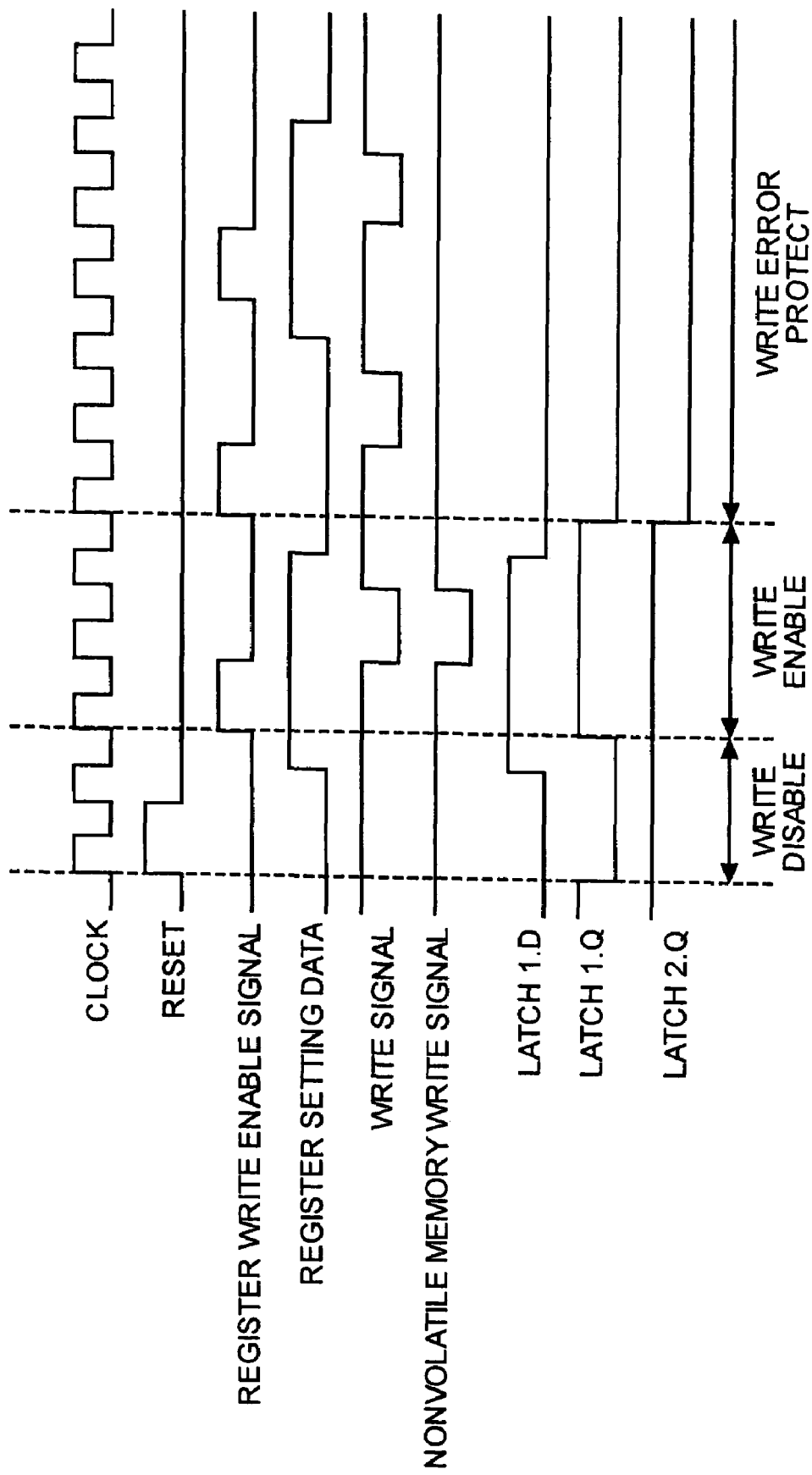
FIG. 4 is timing chart of an operation of the write error protect circuit.

The operation of the write error protect circuit having the above configuration will be explained below. FIG. 4 is timing chart of an operation of the write error protect circuit. At first, when the reset signal is asserted, the output of the first latch circuit 11 becomes "0", and hence the nonvolatile memory write signal becomes "1", that is, is in a negated state. As a result, the write signal is not supplied to the nonvolatile memory 3. In other words, data cannot be written in the nonvolatile memory 3. Further, since the output of the second latch circuit 12 becomes "1" by the reset, and the register setting data is input to the first latch circuit 11 through the first gate 13, "0" or "1" can be written in the register. Therefore, this state is referred to as a write disable state.

When write is performed with respect to the register in the write disable state, the register setting data is latched by the first latch circuit 11, synchronously with the register write enable signal. For example, when the register setting data indicates "1", "1" is output from the first latch circuit 11. Therefore, when the write signal is asserted, the nonvolatile memory write signal output from the second gate 14 is also asserted. That is, data can be written in the nonvolatile memory 3. Further, "1" is latched by the second latch circuit 12, and since the output from the second latch circuit 12 is "1", the write enable state to the register remains. This state is referred to as a write enable state.

On the other hand, if the register setting data is "0", "0" is latched by the first latch circuit 11, and "0" is output from the first latch circuit 11. As a result, even if the write signal is asserted, the nonvolatile memory write signal output from the second gate 14 remains in the negated state. That is, data cannot be written in the nonvolatile memory 3. Further, since "0" is latched by the second latch circuit 12, so that the output from the second latch circuit 12 becomes "0", "0" is input to the first latch circuit 11 at all times. In other words, the write disable state continues, until the second latch circuit 12 is set to "1" by reset, and hence data cannot be written in the nonvolatile memory 3. Therefore, this state is referred to as a write error prevented state.

As shown in FIG. 4, the state is shifted from the write disable state through the write enable state to the write error prevented state. However, by writing "0" in the register in the write disable state, the state may be directly shifted from the write disable state to the write error prevented state.

Figure 5:
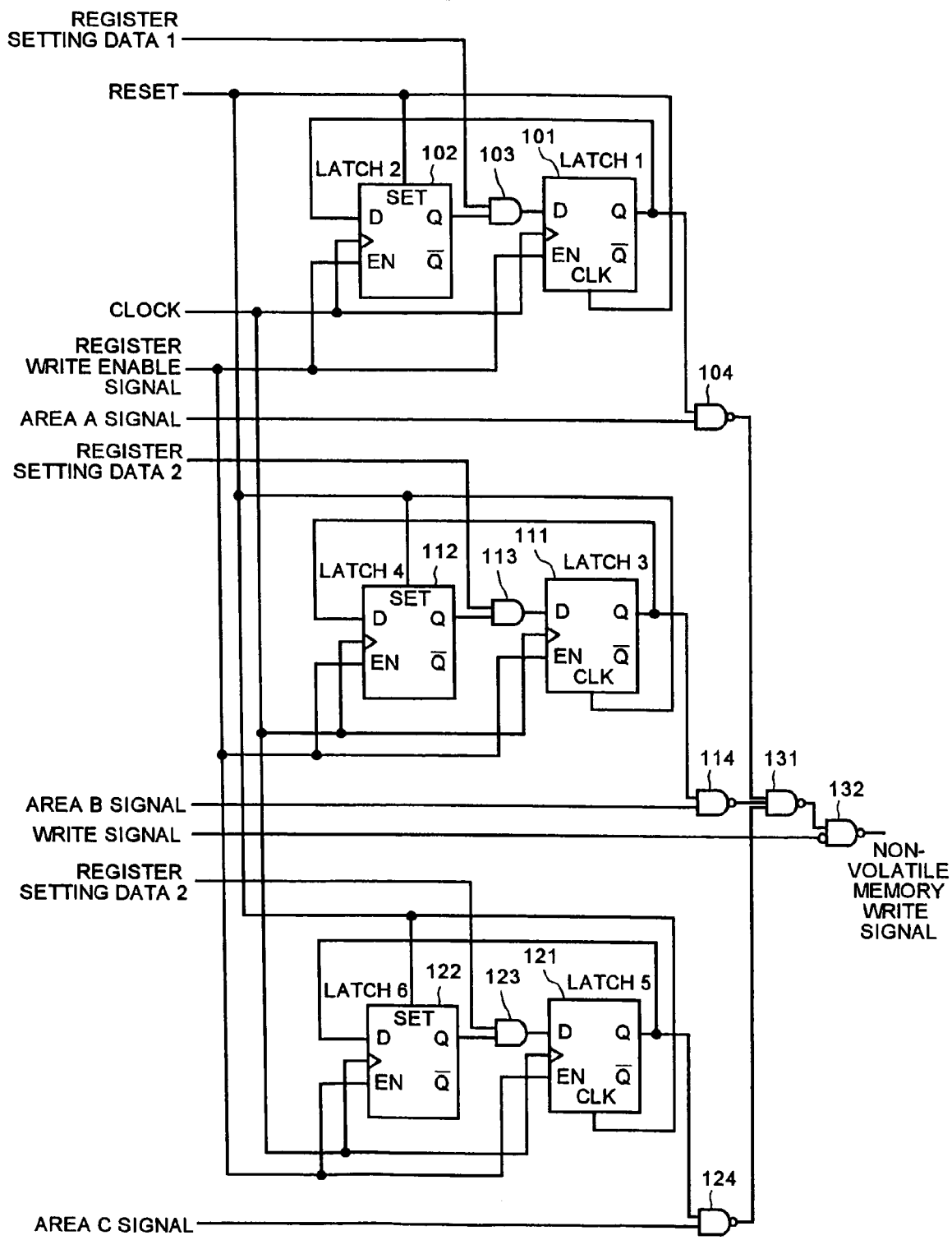
FIG. 5 is a circuit diagram one of an example of the write error protect circuit, with a nonvolatile memory divided into a plurality of areas.

The configuration example of the write error protect circuit shown in FIG. 3 is for controlling the whole memory collectively to the respective write disable, write enable, and write error protect states. As shown in FIG. 2, when the nonvolatile memory 3 is divided into a plurality of areas (A, B, and C), as shown in FIG. 5, the write error protect circuit may have a configuration such that a circuit having the same configuration as that shown in FIG. 3 is provided for each area of A, B, and C. The areas of A, B, and C are sectors or the like. The number of areas is not limited to three, and may be two, or equal to or more than four.

An example in which the nonvolatile memory 3 is divided into A, B, and C areas will be explained. The write error protect circuit in this example includes, as shown in FIG. 5, six latch circuits 101, 102, 111, 112, 121, and 122, and eight gates 103, 104, 113, 114, 123, 124, 131, and 132.

The first latch circuit 101, the second latch circuit 102, and the first gate 103 constitute the write error protect circuit for the area A, and correspond to the first latch circuit 11, the second latch circuit 12, and the first gate 13 in FIG. 3. The third latch circuit 111, the fourth latch circuit 112, and the second gate 113 for the area B correspond to the first latch circuit 11, the second latch circuit 12, and the first gate 13 in FIG. 3. Likewise, the fifth latch circuit 121, the sixth latch circuit 122, and the third gate 123 for the area C correspond to the first latch circuit 11, the second latch circuit 12, and the first gate 13 in FIG. 3.

Therefore, the connection between the first latch circuit 101, the second latch circuit 102, and the first gate 103, the connection between the third latch circuit 111, the fourth latch circuit 112, and the second gate 113, and the connection between the fifth latch circuit 121, the sixth latch circuit 122, and the third gate 123 are the same as the connection between the first latch circuit 11, the second latch circuit 12, and the first gate 13 in FIG. 3, respectively.

In the write error protect circuit for the area A, the output signal from the output terminal Q of the first latch circuit 101 is supplied to the fourth gate 104. An area A signal obtained by decoding the address data supplied from the CPU 2 is also supplied to the fourth gate 104. The fourth gate 104 is a NAND gate, and outputs "0", only when the output signal from the first latch circuit 101 is "1", and the area A signal is asserted.

Likewise in the write error protect circuit for the area B, the output signal from the third latch circuit 111 and an area B signal are supplied to the fifth gate 114. The fifth gate 114 is a NAND gate, and outputs "0", only when the output signal from the third latch circuit 111 is "1", and the area B signal is asserted.

Likewise in the write error protect circuit for the area C, the output signal from the fifth latch circuit 121 and an area C signal are supplied to the sixth gate 124, being a NAND gate. The sixth gate 124 outputs "0", only when the output signal from the fifth latch circuit 121 is "1", and the area C signal is asserted.

The output signals from the fourth gate 104, the fifth gate 114, and the sixth gate 124 are supplied to the seventh gate 131. The seventh gate 131 is a NAND gate, and outputs "1" if any one of the outputs signals from the fourth gate 104, the fifth gate 114, and the sixth gate 124 is "0". The output signal from the seventh gate 131 is supplied to the eighth gate 132.

The eighth gate 132 is a NAND gate corresponding to the second gate 14 in FIG. 3, is supplied with a write signal, and outputs a nonvolatile memory write signal. Therefore, if any one of the areas A, B, and C is selected and the area is in the write enable state, the output signal from the seventh gate 131 becomes "1", and the nonvolatile memory write signal is asserted or negated, according to assert or negate of the write signal.

Further, when any of the areas A, B, and C is not selected, or is in the write disable state or the write error prevented state, the output signal from the seventh gate 131 becomes "0", and hence the nonvolatile memory write signal becomes the negated state. That is, data cannot be written in any of the areas A, B, and C. Stored values in the respective registers determine whether the respective areas are in the write disable state or the write error prevented state.

According to the above embodiment, when the memory area becomes write disable state by reset, and "1" is written in the register, the write enable state is assumed, in which the write signal supplied from the CPU 2 can be output to the nonvolatile memory 3. When "0" is written in the register, until being reset, the write error prevented state is assumed in which output of the write signal supplied from the CPU 2 to the nonvolatile memory 3 is prevented. As a result, it can be prevented that erroneous data is written in the nonvolatile memory 3, due to a noise or a momentary power failure.

The present invention is not limited to the exemplary embodiment, and can be variously changed. For example, the write error protect circuit is not limited to the above configuration. Any one of the CPU 2, the nonvolatile memory control circuit 1, and the nonvolatile memory 3 may be provided in another chip, or the CPU 2, the nonvolatile memory control circuit 1, and the nonvolatile memory 3 may be provided on separate chips. The present invention is applicable to a nonvolatile memory other than the flash memory, so long as it is a rewritable memory, and is also applicable to a volatile memory such as a RAM.

According to the present invention, when the memory area becomes write disable state by reset, and the first data is written in the register, the write enable state is assumed, in which the write signal supplied from the central processing unit can be output to the memory. When second data is written in the register, until being reset, the write error protect state is assumed in which output of the write signal supplied from the central processing unit to the memory is prevented. As a result, it can be prevented that erroneous data is written in the memory, due to a noise or a momentary power failure.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A memory control circuit comprising:
a write error protect circuit, including
a register,
a first gate that sets one of a first data and a second data supplied from the outside into the register, and
a second gate that disables output of a write signal supplied from the outside to a memory when the register is reset, outputs the write signal to the memory when the first data is set into the register, and prevents the output of the write signal to the memory when the second data is set into the register.

2. The memory control circuit according to claim 1, wherein the register comprises:
a first latch circuit that stores "0" by reset; and
a second latch circuit that stores "1" by reset, to which an output signal from the first latch circuit is input,
wherein the first gate outputs one of the first data and the second data to the first latch circuit when an output signal from the second latch circuit is "1", and outputs "0" to the first latch circuit when the output signal from the second latch circuit is "0", and the second gate outputs the write signal to the memory only when the output signal from the first latch circuit is "1".

3. A memory device comprising:
a memory that is rewritable by an input of a write signal from outside to the memory; and
a memory control circuit that includes a write error protect circuit including
a register,
a first pate that sets one of a first data and a second data supplied from outside into the register, and
a second pate that disables output of the write signal to the memory when the register is reset, outputs the write signal to the memory when the first data is set into the register, and prevents the output of the write signal to the memory when the second data is set into the register.

4. The memory device according to claim 3, wherein the register comprises:
a first latch circuit that stores "0" by reset; and
a second latch circuit that stores "1" by reset, to which an output signal from the first latch circuit is input,
wherein the first gate outputs one of the first data and the second data to the first latch circuit when an output signal from the second latch circuit is "1", and outputs "0" to the first latch circuit when the output signal from the second latch circuit is "0", and the second gate outputs the write signal to the memory only when the output signal from the first latch circuit is "1".

5. The memory device according to claim 3, wherein the memory is divided into a plurality of areas in which write disable, write enable, and write error protect are set independently, and the memory includes the write error protect circuit for each area.

6. The memory device according to claim 3, wherein the memory is a nonvolatile memory.

7. The memory device according to claim 6, wherein the nonvolatile memory is a flash memory.

8. A microcomputer comprising:
a central processing unit;
a memory that is rewritable by an input of a write signal from the central processing unit to the memory; and
a memory control circuit that includes a write error protect circuit including a register, a first gate that sets one of a first data and a second data supplied from outside into the register, and a second gate that disables output of the write signal to the memory when the register is reset, outputs the write signal to the memory when the first data is set into the register, and prevents the output of the write signal to the memory when the second data is set into the register.

9. The microcomputer according to claim 8, wherein the register comprises:

a first latch circuit that stores "0" by reset; and a second latch circuit that stores "1" by reset, to which an output signal from the first latch circuit is input, wherein the first gate outputs one of the first data and the second data to the first latch circuit when an output signal from the second latch circuit is "1", and outputs "0" to the first latch circuit when the output signal from the second latch circuit is "0", and the second gate outputs the write signal to the memory only when the output signal from the first latch circuit is "1".

10. The microcomputer according to claim 8, wherein the memory is divided into a plurality of areas in which write disable, write enable, and write error protect are set independently, and the memory includes the write error protect circuit for each area.

11. The microcomputer according to claim 8, wherein the memory is a nonvolatile memory.

12. The microcomputer according to claim 11, wherein the nonvolatile memory is a flash memory.

13. The microcomputer according to claim 8, wherein the central processing unit, the memory, and the memory control circuit are integrated in a same semiconductor chip.

* * * * *

UNITED STATES PATENT AND TRADEMARK OFFICE
CERTIFICATE OF CORRECTION

| | | |
|---|---|---|
| PATENT NO. | : 7,174,435 B2 | Page 1 of 1 |
| APPLICATION NO. | : 10/715366 | |
| DATED | : February 6, 2007 | |
| INVENTOR(S) | : Tetsuya Yoshida et al. | |

It is certified that error appears in the above-identified patent and that said Letters Patent is hereby corrected as shown below:

Column 6, Line 32, change "pate" to --gate--.

Column 6, Line 34, change "pate" to --gate--.

Signed and Sealed this

Twenty-ninth Day of May, 2007

JON W. DUDAS
*Director of the United States Patent and Trademark Office*